Patented Feb. 17, 1931

1,793,157

UNITED STATES PATENT OFFICE

WILLIAM R. CHAPIN, OF INDIANAPOLIS, INDIANA

METAL CEMENT

No Drawing.   Application filed January 4, 1930.  Serial No. 418,661.

This invention relates to a cement for joining metals and more particularly for joining steel, such for example as high speed steel, tungsten carbide and other metals and consists of a compound which by long experimenting and considerable use has been found to be particularly adapted for securing a perfect union of the metals where a high speed steel is joined to a tougher steel back or shank.

An object of the invention is to provide a cementing compound which will not only join metal securely together but which will show scarcely any trace of the joints.

For this cement I preferably use a mixture containing fine steel filings, powdered borax glass, silico manganese and powdered copper.

In preparing the compound these elements are reduced to finely divided powdered form, then thoroughly mixed to provide a perfectly uniform mixture of the elements. While not restricting myself to any specific proportions I nevertheless have found the following percentages result in a thoroughly satisfactory compound, namely, 25% fine steel filings, 10% powdered borax glass, 25% powdered copper, and 40% silico manganese. This mixture results in a cement particularly adapted for cementing tungsten carbide and other metals to a steel shank.

The process of cementing is as follows: The parts to be joined are covered with a layer of approximately $\frac{1}{32}$ of an inch of the compound; the ends are then placed together and held together, and heated to temperatures suitable to the particular metals which are to be joined. For high speed steel I have found the best temperature to be about 2300 to 2350 degrees F.; for tungsten carbide the cementing temperature ranges between 2175° to 2250° F.; for stellite the temperature may be between 2200° and 2250° F.; other steels may have a temperature range somewhat different. Where large pieces are to be cemented they may first be placed in a preheating chamber which is maintained at a temperature below the cementing temperature, generally at a temperature between 1500° and 1600° F.

After the metals are subject to the high temperatures they are removed from the heat and the surfaces to be joined are tightly pressed together to remove any surplus compound. They are then allowed to cool under pressure until such time as the cement has set in the joint and then removed from the pressure and if desired are quenched, the temperature being drawn afterwards to suit the work.

It will be obvious to those skilled in the art that various changes may be made in my product without departing from the spirit of the invention, and I, therefore do not limit myself to those proportions named in the specification, but only as set forth in the appended claims.

Having thus fully described my said invention, what I claim as new and desire to secure by Letters Patent, is:

1. A cementing compound consisting of approximately 40% silico manganese, approximately 25% powdered copper, between 1% and 10% powdered borax glass, and the remainder fine steel filings, substantially as set forth.

2. A cementing compound consisting of a mixture of approximately 40% silico manganese, 25% powdered copper, 10% powdered borax glass, and 25% steel filings, substantially as set forth.

In witness whereof, I have hereunto set my hand at Indianapolis, Indiana this 2nd day of January, A. D. nineteen hundred and thirty.

WILLIAM R. CHAPIN.